United States Patent [19]

Ling

[11] Patent Number: 4,813,073
[45] Date of Patent: Mar. 14, 1989

[54] ECHO CANCELLATION

[75] Inventor: Fuyun Ling, Jamaica Plain, Mass.

[73] Assignee: Codex Corporation, Mansfield, Mass.

[21] Appl. No.: 69,250

[22] Filed: Jul. 2, 1987

[51] Int. Cl.$^4$ .............................................. H04L 5/14
[52] U.S. Cl. ..................................... 379/410; 379/411; 370/32.1
[58] Field of Search ........................ 579/406, 410, 411; 370/32, 32.1; 364/724

[56] References Cited

U.S. PATENT DOCUMENTS

| Re. 31,253 | 5/1983 | Weinstein | 370/32.1 |
|---|---|---|---|
| 3,903,377 | 9/1975 | Sato | 379/411 |
| 4,072,830 | 2/1978 | Gitlin et al. | 379/411 |
| 4,074,086 | 2/1978 | Falconer et al. | 379/410 |
| 4,131,767 | 12/1978 | Weinstein | 379/411 |
| 4,344,126 | 8/1982 | Qureshi | 363/126 |
| 4,535,206 | 8/1985 | Falconer | 370/32.1 |
| 4,558,187 | 12/1985 | Billi et al. | 379/402 |
| 4,577,309 | 3/1986 | Barazeche et al. | 370/13 |
| 4,578,544 | 3/1986 | de Verdiere et al. | 379/410 |
| 4,587,382 | 5/1986 | Yang | 370/32.1 |
| 4,613,731 | 9/1986 | Godard | 379/410 |
| 4,628,157 | 12/1986 | Chance et al. | 379/410 |
| 4,645,884 | 2/1987 | Barazeche et al. | 379/406 |

OTHER PUBLICATIONS

Gitlin et al, "A Phase Adaptive Structure for Echo Cancellation", IEEE Transactions on Communications, vol. com-26, No. 8, Aug. 1978.
Weinstein, "A Passband Data-Driven Echo Canceller for Full-Duplex Transmission on Two-Wire Circuits", IEEE Transactions On Communications, vol. Com-25, No. 7, Jul. 1977.
Wang et al, "Performance Analysis of An Echo-Cancellation Arrangement That Compensates For Frequency Offset in the Far Echo".
Wittke et al., "Measurements of Echo Parameters Pertinent to High-Speed Full-Duplex Data Transmission on Telephone Circuits", IEEE Journal on Selected Areas In Communication, vol. Sac-2, No. 2, Sep. 1984.
Werner, "Effects of Channel Impairments on the Performance of an In-band Data-Driven Echo Canceler", AT&T Technical Journal, vol. 6, No. 1, Jan., 1985.

*Primary Examiner*—Eugene R. LaRoche
*Assistant Examiner*—David Mis

[57] ABSTRACT

Echo cancellation to remove, from a locally received data communication signal, an echo signal component having a changing phase difference relative to the phase of a locally transmitted data communication signal, said locally transmitted communication signal are generated by modulating a carrier based on sequences of complex data signal points, is accomplished by correcting the phase of an input sequence of complex samples of the modulated carrier based on the changing phase difference to generate complex phase corrected samples, and generating a real-valued simulation of the echo signal based on the complex, phase corrected samples. Another aspect is estimating the phase difference between two signals based on samples of the real signal component of one of the signals, and the real component of the difference between the signals; successive estimates of the phase difference are generated based on successive applications of an approximate Hilbert transform to samples of each of the real signal component of one of the signals, and to the samples of the real component of the difference between the signals, each application of the Hilbert transform being limited to two of the samples. Another aspect is averaging a succession of sample values and scaling the result of the averaging in accordance with a variable scaling factor; the succession of sample values is accumulated as a cumulative sample value, and an output indicative of the result is provided by comparing the cumulative sample value with a threshold that is based on the variable scaling factor.

16 Claims, 2 Drawing Sheets

ECHO CANCELLATION

BACKGROUND OF THE INVENTION

This invention relates to echo cancellation in communication systems.

In typical full duplex data communication, a local data terminal may simultaneously send and receive data to and from a remote data terminal on, e.g., a single two-wire telephone line. Hybrid couplers are located at both ends of the channel for the purpose of isolating the incoming and outgoing signals. Because the hybrid couplers operate imperfectly, the outgoing signal may be partially reflected at the local hybrid coupler in the form of a so called near echo and at the remote hybrid coupler in the form of a so-called far echo. Both echoes corrupt the incoming signal.

The near echo is essentially identical in carrier frequency to the local outgoing signal. It can therefore be eliminated easily by a conventional near echo canceller in the form of an adaptive linear transversal filter that simulates the near echo transfer function which produced the near echo. For this purpose, the complex signal points for the outgoing signal are passed through the near echo canceller to generate a simulated near echo signal which is simply subtracted from the incoming (near-echo corrupted) signal.

Correcting the far echo is not as simple, because it may have a continually shifting phase (phase roll or frequency offset) relative to the original outgoing signal. This may be caused, for example, by small differences (e.g., 1 Hz) between the carrier frequency of the outgoing signal and the carrier frequency of the far echo signal that occur when circuits used to step up and step down the signal carrier frequency (e.g., for a satellite hop) are not perfectly matched. Because of the non-linearity in the far echo transfer function (represented by the changing phase), a far echo canceller in the form of a linear transversal filter is unable to adequately simulate the far echo transfer function.

One known solution is to continually correct the phase of the complex output of a conventional far echo canceller in accordance with a detected difference in phase between the simulated far echo signal and the actual far echo (in the local incoming signal).

In such a scheme, the signal points for the outgoing signal are passed through a conventional bulk delay element that simulates the delay associated with the distance to the remote terminal. The far echo canceller then uses the delayed signal points to generate the complex simulated far echo signal. After phase correction in the complex domain, the real part of the simulated far echo, like the simulated near echo, is subtracted from the incoming signal.

It is also known to cancel an echo of a telephone voice signal by phase correcting complex components derived from the voice signal and providing a real-valued phase corrected signal to an echo canceller, but in that scheme the updating of the phase correction circuitry is inhibited during double talk.

It is known that the power level of the far echo is unpredictable, but is usually lower than the level of the signal from the remote transmitter, and that the frequency of the phase roll is relatively low compared to the signaling rate.

SUMMARY OF THE INVENTION

A general feature of the invention provides echo cancellation apparatus for removing, from a locally received data communication signal, an echo signal having a changing phase difference relative to the phase of a locally transmitted data communication signal, where the locally transmitted communication signal is generated by modulating a carrier based on sequences of data signal points; the apparatus includes a phase corrector for correcting the phase of an input sequence of complex samples of the modulated carrier based on the changing phase difference to generate complex, phase corrected samples, and an echo canceller for generating a real valued simulation of the echo signal based on the complex, phase-corrected samples.

Preferred embodiments include the following features. The changing phase difference includes a phase roll at a frequency which is substantially lower than the signaling rate. The communication signals are carried on a channel between a local terminal and a remote terminal and the echo signal is a far echo. The phase corrector includes a complex modulator for correcting the input sequence of signals in the complex domain in accordance with the changing phase difference. The echo canceller includes a linear adaptive transversal filter which generates a simulated real valued far echo.

Another general feature of the invention provides apparatus for estimating the phase difference between two signals based on samples of the real signal component of one of the signals, and samples of the real component of the difference between the signals; the apparatus includes means for generating successive estimates of the phase difference based on successive applications of an approximate Hilbert transform to samples of each of the real signal component of one of the signals, and to the samples of the real component of the difference between the signals, each application of the Hilbert transform being limited to two of the samples.

Preferred embodiments include the following features The logic implements an expression of the form $$e(k)^*\hat{E}_f(k-1) - e(k-1)^*\hat{E}_f(k)$$

where $e(k)$ denotes the kth sample of the difference between the two signal components, and $\hat{E}_f(k)$ denotes the kth sample of the real signal component. The means includes a pair of delay elements for receiving the samples of the respective real signal components, a pair of multipliers, one multiplier for multiplying the delayed sample of the one real signal component delivered at the output of one of the delay elements by the sample of the real component of the difference, the other multiplier for multiplying the current sample of the real signal component by the delayed sample of the real component of the difference, and a summer to subtract the respective products generated by the multipliers to generate each estimate of the phase difference.

Another general feature of the invention provides apparatus for averaging a succession of sample values and scaling the result of the averaging in accordance with a variable scaling factor; the apparatus includes an integrate circuit for accumulating the succession of sample values as a cumulative sample value, and threshold circuitry for providing an output indicative of the result by comparing the cumulative sample value with a threshold that is based on the variable scaling factor.

Preferred embodiments include the following features. The sample values comprise estimates of the phase difference between a simulated far echo signal in a full duplex communication system and a corresponding actual far echo signal. The variable scaling factor comprises an estimate of the power of a far echo signal in a full duplex communication system.

The invention achieves echo cancellation including phase roll compensation using a relatively simple echo canceller that need not generate complex output. The invention takes advantage of the fact that the transmitted data signal points are complex. The effect on the phase roll compensation of changing power level of the far echo is eliminated. The phase difference signal is simultaneously averaged and scaled without requiring a division operation, which would be time consuming to perform using commercially available DSP (VLSI digital signal processor) chips. The far echo phase may be tracked even during full duplex operation. The effect of the relatively strong signal from the remote modem on the estimation of the phase error is substantially reduced by signal averaging. The long time constant required for averaging presents no difficulty because of the slowness of changes in the amount of phase roll.

Other advantages and features will become apparent from the following description of the preferred embodiment, and from the claims.

Preferred Embodiment

We first briefly describe the drawings.

STRUCTURE

Figure 1:
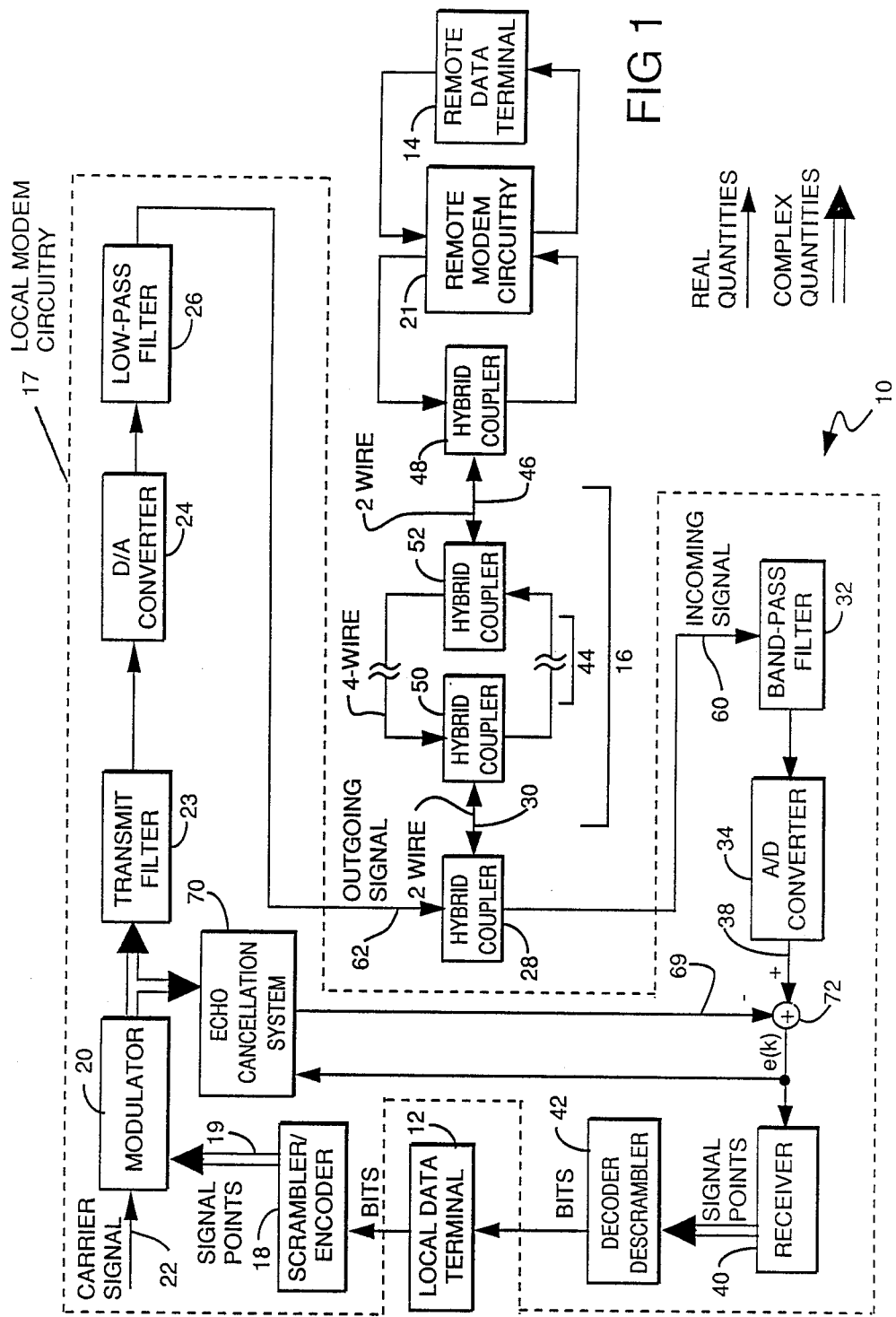
FIG. 1 is a block diagram of a data communication system including echo cancellation.

Referring to FIG. 1, in a data communication system 10 a local data terminal 12 may need to both send and receive data bits to and from a remote data terminal 14 via local modem circuitry 17 and channel 16. Data terminal 12 delivers the outgoing bits to a scrambler/encoder 18 which generates a sequence of corresponding complex signal points (as indicated by the double line 19). The signal points are delivered to a modulator 20, which modulates digital samples of a carrier signal 22 accordingly, e.g., by quadrature amplitude modulation. The complex modulated carrier samples are then filtered (in transmit filter 23) to generate real modulated samples that are digital-to analog converted (in converter 24), low-pass filtered (in low pass filter 26) to produce an analog modulated carrier, and then delivered to a hybrid coupler 28, which routes the analog modulated carrier signal to a 2-wire line 30 (which forms one leg of channel 16).

The 2-wire line 30 simultaneously carries both the outgoing modulated carrier signal and an incoming modulated carrier signal from remote modem circuitry 21 which serves remote data terminal 14 at the other end of channel 16. Hybrid coupler 28 routes the incoming signal to a band pass filter 32 and an analog-to digital converter 34, to generate digital samples 38 of the incoming signal. After correction of samples 38 to compensate for echoes (as described below), the corrected samples (denoted e(k) where k represents the sample interval index) are sent to a receiver 40. The resulting complex signal points are delivered to a decoder/descrambler 42, which recovers the bits (originated at remote data terminal 14) for delivery to local data terminal 12.

Channel 16 typically includes (in addition to leg 30) a 4-wire leg 44 and a second, remote 2-wire leg 46 which links 4-wire leg 44 via a hybrid coupler 48 to remote modem circuitry 21. A pair of hybrid couplers 50, 52 connect 4-wire leg 44 respectively to 2-wire legs 30, 46. The term "4-wire" refers to a scheme in which the signals going to and from the end of the channel are carried independently. The term "2-wire" means that the two signals are carried together. The 4-wire leg could represent, for example, a pair of satellite links.

An impedance mismatch at any of the hybrid couplers may cause, e.g., the outgoing signal on line 62 to be echoed to the receiving line 60.

Because the outgoing and incoming signals are carried independently in leg 44, no echoes are produced in that section. Assuming leg 44 contributes most of the propagation delay between local data terminal 12 and remote data terminal 14, echoes may be called either near end echoes (if they represent echoes, e.g. from hybrid 28 or 50), or far-end echoes (reflected e.g., at hybrid 52, 48).

To eliminate the echoes from the incoming signal on line 60, an echo cancellation system 70 generates simulated samples of the near and far echoes on line 69 for subtraction in summer 72 from the digital samples 38 of the incoming signal, to generate e(k).

Figure 2:
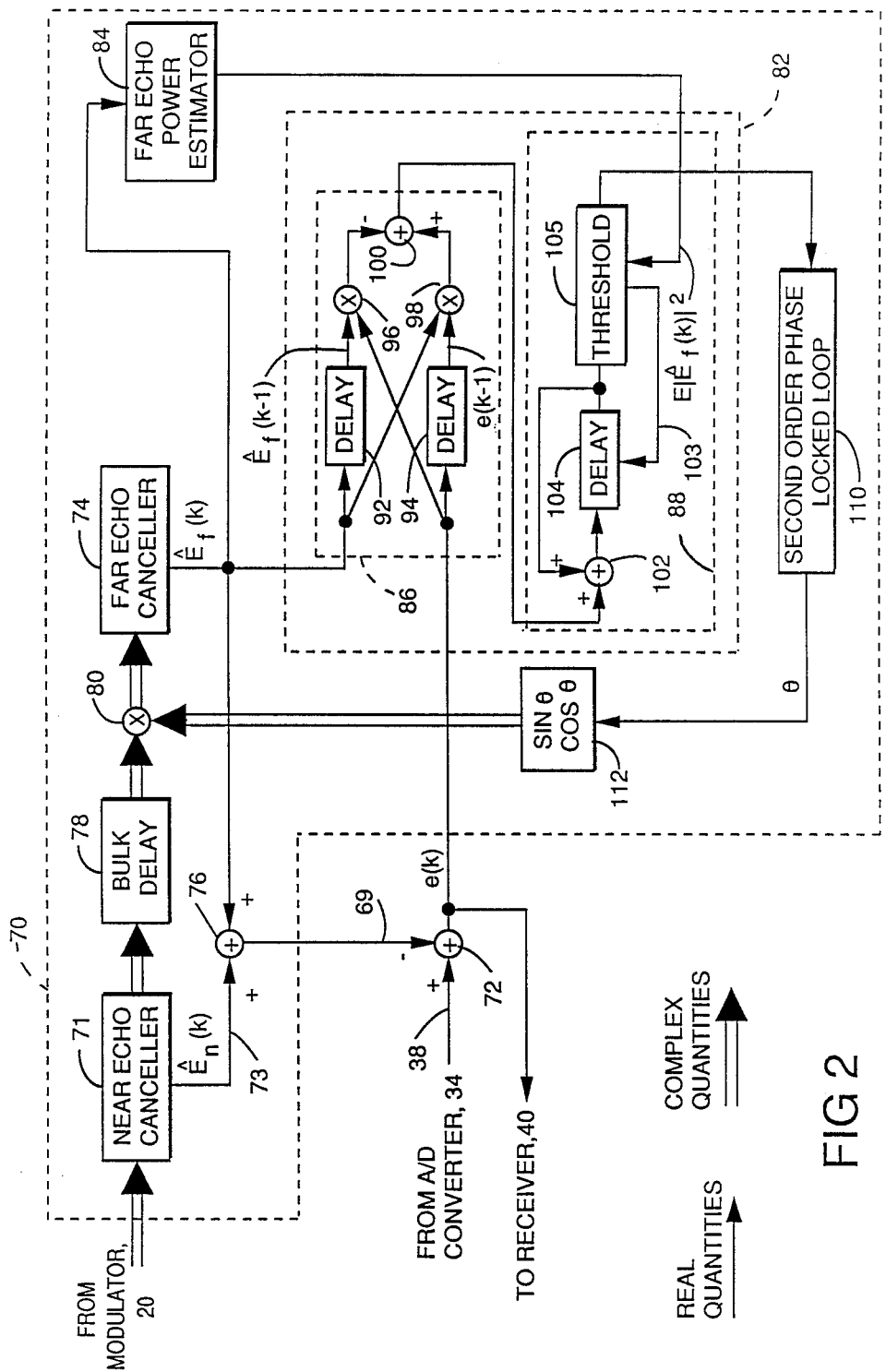
FIG. 2 is a block diagram of echo cancellation circuitry.

Referring to FIG. 2, echo cancellation system 70 has near and far echo cancellers 71, 74 to simulate the near and far echo transfer functions of channel 16 which produced respectively the near and far echo signals. Near echo canceller 71 is a linear adaptive transversal filter which linearly combines successive signal points from modulator 20 using adaptive coefficients that are adjusted rapidly during an initial training period to represent the near echo transfer function. During operation the coefficients may be updated slowly.

The output of near echo canceller 71 on line 73 is a real-valued simulated near echo signal $\hat{E}_n(k)$. Near echo signal $\hat{E}_n(k)$ is summed with an estimate of the far echo signal (denoted $\hat{E}_f(k)$) in a summer 76. The output of summer 76 is applied to summer 72 to eliminate the near echo from signal samples 38 and compensate for the far echo.

After a signal point reaches the end of the filter in canceller 71, it passes through bulk delay simulator 78, which simulates the distance related time delay between the local transmission of a modulated carrier on channel 16 and the return of the far echo signal. The signal points delivered by delay 78 are phase adjusted in a modulator 80 and then enter far echo canceller 74, which generates $\hat{E}_f(k)$ using a linear transversal adaptive filter. It is possible to place modulator 80 ahead of echo canceller 74 because the period of the phase roll is much longer than the time spanned by echo canceller 74, and thus the phases of all signal points in the canceller are almost the same.

In order for far echo canceller 74 to simulate accurately the far echo transfer function, it is necessary to determine the phase difference between the actual far echo and the simulated far echo signal $\hat{E}_f(k)$.

The exact actual far echo is, of course, unknown. But the e(k) 38 samples contain information about any residual far echo that remains after the process of far echo cancellation; the residual far echo information is sufficient for simulating the far echo. The e(k) 38 samples may also include a negligibly small residual near echo signal, and other non negligible components (including the relatively strong data signal transmitted from the remote modem 21) that can be regarded as noise for purposes of phase roll compensation.

A phase difference estimator 82 estimates the phase difference between the actual far echo and the simulated far echo $\hat{E}_f(k)$.

If $E_f(k)$ is the real part of an analytic (complex) actual far echo signal $\epsilon_f(k)$, i.e. $E_f(k) = Re[\epsilon_f(k)]$, then the simulated far echo signal from far echo canceller 74, $\hat{E}_f(k)$ becomes $\hat{E}_f(k) = Re[e^{j\phi}\epsilon_f(k)]$ where $\phi$ is the phase error (difference) between the actual and simulated far echoes.

If $\epsilon_f(k)$ and $e^{j\phi}\epsilon_f(k)$ are thought of as vectors in a complex plane, it can be shown that $$\sin \phi = [Im[e^{j\phi}\epsilon_f(k)]Re[\epsilon_f(k)] - Im[\epsilon_f(k)]$$

$$Re[e^{j\phi}\epsilon_f(k)]]/|e^{j\phi}\epsilon_f(k)||\epsilon_f(k)| =$$

$$[Im[e^{j\phi}\epsilon_f(k)]Re[\epsilon_f(k) - e^{j\phi}\epsilon_f(k)] - Im\,[\epsilon_f(k) -$$

$$e^{j\phi}\epsilon_f(k)]Re[e^{j\phi}\epsilon_f(k)]]/|e^{j\phi}\epsilon_f(k)|^2.$$

Assuming $\phi$ is small, $$\phi \approx \sin \phi, \text{ and } |\epsilon_f(k)||e^{j\phi}\epsilon_f(k)| \approx |e^{j\phi}\epsilon_f(k)|^2$$

Furthermore, $e(k)$ is an unbiased estimate of $Re[\epsilon_f(k) - e^{j\phi}E_f(k)]$ embedded with a substantial amount of noise representing the data signal originating at remote terminal 14. By denoting $e(k) = Re[\delta(k)]$, $$\sin \phi = [Im[e^{j\phi}\epsilon_f(k)]Re[\delta(k)] - Im[\delta(k)]Re[e^{j\phi}\epsilon_f(k)]] \cdot /|e^{j\phi}\epsilon_f(k)|^2$$

The imaginary parts of $e^{j\phi}\epsilon_f(k)$ and $\delta(k)$ could be computed by taking the Hilbert transform of $E_f(k)$ and $e(k)$, respectively. This is a computationally intensive process.

A Hilbert transform generates the imaginary part of, for example, the complex signal $\delta(k)$, based on the real part $e(k)$ as $$Im[\delta(k)] = \sum_{i=-Q}^{+Q} c_i e(k-i)$$

where
Q = integer;
$c_i = 0$, for i even; and
$c_i = (2/\pi)(1/i)$, for i odd.
This entails an inherent delay of Q intervals.

To find $\sin \phi$ based on the above equation would require two full Hilbert transformers to generate values for $Im[e^{j\phi}\epsilon_f(k)]$ and $Im[\delta(k)]$.

In the invention, the Hilbert transform is reduced to two terms, Q = 1, i.e.

$$Im[\delta(k)] \approx \sum_{i=-1}^{+1} c_i Re[\delta(k-i)] =$$

$$-(2/\pi)Re[\delta(k+1)] + (2/\pi)Re[\delta(k-1)];$$

$$Im[e^{j\phi}\epsilon_f(k)] \approx \sum_{i=-1}^{+1} c_i Re[e^{j\phi}\epsilon_f(k-i)] =$$

$$-(2/\pi)Re[e^{j\phi}\epsilon_f(k+1)] + (2/\pi)Re[e^{j\phi}E_f(k-1)]$$

Because $e(k)$ is very noisy, using only the first two terms of the Hilbert transform will not degrade the performance of the echo cancellation system. Ignoring other terms of the Hilbert transform simplifies the computational complexity of the phase error estimation process.

By taking the first two terms of the Hilbert transform, the imaginary parts of $e^{j\phi}\epsilon_f(k)$ and of $\delta(k)$ are approximated as follows:

$$Im[e^{j\phi}\epsilon_f(k)] \approx [\hat{E}_f(k-1)]/\alpha, \text{ and}$$

$$Im[\delta(k)] \approx [e(k-1) - e(k+1)]/\alpha$$

where $\alpha$ is a constant for scaling.

$|e^{j\phi}\epsilon_f(k)|^2$ can be approximated by the average value of $|\hat{e}_f(k)|^2 = E[|\hat{E}_f(k)|^2]$ where E denotes expectation operation) times two. Thus $$\phi = [[\hat{E}_f(k-1) - \hat{E}_f(k+1)]^*e(k) - \hat{E}_f(k)^*[e(k-1) - e(k+1)]]/[\alpha 2^* E[|\hat{E}_f(k)|^2]]$$

After summing the above equation over successive values of k, to eliminate the noise component of the signal $e(k)$, $$N\phi \sum_{k=0}^{N-1} [E_f(k-1) - \hat{E}_f(k+1)]^*e(k) - \hat{E}_f(k)^*[e(k-1) -$$

$$e(k+1)]]/[\alpha^* 2^* E[|\hat{E}_f(k)|^2]]$$

By combining the terms in the above equation and approximating the first and last terms (k=0, k=N-1), $$N\phi = \sum_{k=0}^{N-1} [e(k)^*\hat{E}_f(k-1) - e(k-1)^*\hat{E}_f(k)]/[\alpha^* E[|\hat{E}_f(k)|^2]] \quad (1)$$

Phase difference estimator 82 implements the above equation, based on $e(k)$, $\hat{E}_f(k)$, and $E[|\hat{E}_f(k)|^2]$. The power of the output of far echo canceller 74, $E[|\hat{E}_f(k)|^2]$ is estimated by a conventional far echo power estimator 84, e.g. one that uses a single pole low pass filter.

Phase difference estimator 82 includes two circuits.

Circuit 86 computes the expression $e(k)^*\hat{E}_f(k-1) - e(k-1)^*\hat{E}_f(k)$ in the numerator of equation (1). Delay elements 92, 94 respectively store $E_f(k)$ and $e(k)$ for one sample interval (having the same interval length as the output sample interval of canceller 74). Multipliers 96, 98, and summer 100 then calculate the desired value from $\hat{E}_f(k)$, $\hat{E}_f(k-1)$, $e(k)$, and $e(k-1)$.

Variable threshold integrate and-dump circuit 88 effectively sums successive values of the above expression in order to remove the noise component, and simultaneously normalizes it by $1/[\alpha^* E[|\hat{E}_f(k)|^2]]$, the denominator in equation (1). In circuit 88, summer 102 and delay element 104 are connected as a conventional integrator to accumulate the outputs of circuit 86 over a succession of time intervals. Circuit 88 integrates the output of circuit 86 until the integrated value reaches a threshold proportional to $\alpha^* E[|\hat{E}_f(k)|^2]$. The output of circuit 82 is a fixed value that is either positive or negative depending on whether the output of delay element 104 is positive or negative. Each time circuit 82 delivers an output value, delay element 104 is cleared (by a signal on line 103), and another cycle begins.

In operation, if the amount of phase roll (frequency offset) remains constant and its frequency and phase are the same as the internal frequency and phase of the second order phase locked loop (PLL), then there will be no phase difference between the actual echo and simulated echo signal $\hat{E}_f(k)$; and the output values of circuit 86 will be zero on average. The value in delay 104 will never reach the threshold and no output will be delivered from circuit 88. The PLL 110 will then continue to issue successive output values $\theta$ with each $\theta$ differing from the previous $\theta$ by a constant amount such that the successive values $\theta$ correspond to the constant frequency difference.

If the amount of phase roll begins to change or the internal frequency or phase of the PLL is different from the phase roll frequency or phase, the difference between the phases of the actual echo and the simulated echo $\hat{E}_f(k)$, as delivered from the output of circuit 86, will begin to acummulate in delay 104. When the total amount of the accumulated phase difference exceeds the threshold defined by the far echo power level, then a fixed value will be delivered from circuit 88 to PLL 110, causing it to update the successive values of $\theta$ to reflect the necessary additional phase change and frequency change. The fixed value delivered to PLL 110 is a value selected to be appropriate for the operating characteristics of the PLL. The sign of the fixed value will indicate whether the value of $\theta$ should be incremented or decremented by PLL 110 to reflect the additional changes in phase and frequency. The level of the signal delivered to the input of circuit 88 will vary with the power level of the far echo for a given phase error $\phi$. It would be possible to insert in the line between circuits 86, 88 a scaling element that would divide each signal sent out of circuit 86 by a value corresponding to the power level output of estimator 84, and thus account for the changing level.

Instead, circuit 88 includes a threshold element 105 that governs when circuit 88 will deliver a value to PLL 110 corrected in accordance with the power level output of estimator 84. In this way, no division computation is needed. Note that the power level factor included in the input signal to circuit 88 is eliminated by the power level dependent thresholding; and the frequency with which values are sent from threshold circuit 105 to PLL 110 depends on the phase error (difference), not on the power level of the far echo.

It is necessary to average the phase difference over time because the presence of the signal sent from the remote terminal in the signal e(k) would otherwise cause the output of phase difference estimator 82 to be very noisy. Although the averaging increases the time constant of the phase-roll compensator, its performance is not affected because changes in frequency and/or phase of the phase roll occur slowly. Further, the estimate of phase difference generated by circuit 86 need not be very accurate in light of the heavy averaging done by circuit 88. The use of variable-threshold integrate and dump circuit 88 eliminates the need to perform divisions. Also, the present method is computationally efficient because it does averaging and normalization in one operation.

The average estimated phase error $\phi$ is fed to second order phase locked loop 110, which provides at its output a changing value $\theta$ equal to the absolute phase correction to eliminate the aggregate phase offset in the input to canceller 74. A sinusoidal signal generator 112 generates $\sin \theta$ and $\cos \theta$ from $\theta$. Modulator 80 modulates the input to far echo canceller 74 by the output of conventional sinusoidal signal generator 112.

Due to the long time constants used in circuit 82, in full duplex mode circuit 82 and PLL 110 cannot learn the phase roll frequency or track a rapid phase-roll frequency change. The circuit must be trained during half duplex mode (while no remote transmitter signal exists) with smaller time constants to quickly learn the phase-roll frequency. When entering the full duplex mode, circuit 82 and the PLL is switched to a long time constant mode to further learn and track the phase and frequency of the phase-roll while smoothing out the effect of the strong remotely transmitted signal.

The far echo canceller may be trained together with circuit 82 and PLL 110 to obtain jointly optimal performance or the far echo canceller may be trained first, then circuit 82 and PLL 110, which is possible if the phase-roll frequency and the far echo level are not too high. Circuit 82 and PLL 110 cannot be trained before starting the training of the far echo canceller, because it is necessary to have at least some information about the far echo to learn the frequency of the phase roll.

Other embodiments ar within the following claims.

I claim:

1. Echo cancellation apparatus for removing, from a locally received data communication signal, an echo signal component having a changing phase difference relative to the phase of a locally transmitted data communication signal, said locally transmitted communication signal being generated by modulating a carrier based on sequences of complex data signal points, said apparatus comprising
    a phase corrector for correcting the phase of an input sequence of complex samples of said modulated carrier based on said changing phase difference to generate complex, phase corrected samples, and
    an echo canceller for generating a real valued simulation of said echo signal based on said complex, phase corrected samples.

2. The apparatus of claim 1 wherein said changing phase difference includes a phase roll at a particular frequency which is substantially lower than the signaling rate.

3. The apparatus of claim 1 wherein said communication signals are carried on a channel between a local terminal and a remote terminal and said echo signal comprises a far echo.

4. The apparatus of claim 1 wherein said phase corrector comprises a complex modulator for correcting said input sequence of signals in the complex domain in accordance with said changing phase difference.

5. The apparatus of claim 1 wherein said echo canceller comprises a linear adaptive transversal filter.

6. The apparatus of claim wherein said transveral filter generates a simulated real-valued far echo signal.

7. Apparatus for filtering a succession of sample values and generating a filtered output inversely proportional to a variable scaling factor, comprising
    an integrating circuit for accumulating said succession of said sample values as a cumulative data value, and
    threshold circuitry for generating said output by comparing said cumulative data value with a threshold that is based on said variable scaling factor.

8. The appartus of claim 7 wherein said sample values comprise estimates of the phase difference between a simulated echo signal and a corresponding actual echo signal.

9. The apparatus of claim 7 wherein said variable scaling factor comprises an estimate of the power of an echo signal.

10. The apparatus of claim 8 or 9 wherein said echo is a far echo in a full duplex communication system.

11. Apparatus for estimating the phase difference between two signals based on samples of the real signal component of one of the signals, and samples of the real component of the difference between said signals, comprising means for generating successive estimates of said phase difference based on successive applications of an approximate Hilbert transform to said samples of said real signal component and to said samples of said real component of said difference, each application of said Hilbert transform being limited to two said samples.

12. The apparatus of claim 11 wherein said logic implements an expression of the form $$e(k)*\hat{E}_f(k-1) - e(k-1)*\hat{E}_f(k)$$

where $e(k)$ denotes the kth sample of the difference between the two signal components, and $\hat{E}_f(k)$ denotes the kth sample of said real signal component.

13. The apparatus of claim 11 wherein said means comprises a pair of delay elements for receiving said samples of said respective real signal components, a pair of multipliers, one said multiplier for multiplying the delayed sample of said real signal component by the current sample of the real component of the difference, the other said multiplier for multiplying the current sample of the real signal component by the delayed sample of the real component of the difference, and a summer for subtracting the respective products generated by said multipliers to generate each said estimate of said phase difference.

14. An echo cancellation method for removing, from a locally received data communication signal, an echo signal component having a changing phase difference relative to the phase of a locally transmitted data communication signal, said locally transmitted communication signal being generated by modulating a carrier based on sequences of data signal points, said method comprising correcting the phase of an input sequence of complex samples of said modulated carrier, based on said changing phase difference to generate complex phase corrected samples, and generating a real valued simulation of said echo signal based on said complex, phase corrected samples.

15. A method for filtering a succession of sample values and generating a filtered output inversely proportional to a variable scaling factor, comprising accumulating said succession of sample values as a cumulative sample value, and generating said output by comparing said cumulative sample value with a threshold that is based on said variable scaling factor.

16. A method for estimating the phase difference between two signals based on samples of the real signal component of one of the signals, and samples of the real component of said phase difference, comprising generating successive estimates of said phase difference based on successive applications of an approximate Hilbert transform to samples of said real signal component and to said samples of said real component of said difference of said signals, each application of said Hilbert transform being limited to two said samples.

* * * * *

UNITED STATES PATENT AND TRADEMARK OFFICE
CERTIFICATE OF CORRECTION

PATENT NO. : 4,813,073

DATED : March 14, 1989

INVENTOR(S) : Fuyun Ling

It is certified that error appears in the above-identified patent and that said Letters Patent is hereby corrected as shown below:

On the title page:

U.S. Patent Documents: 4,578,544 insert --Colin-- before "de".

Other Publications: Weinstein, "On" should be --on--.

Other Publications: Werner, "Canceler" should be --Canceller--.

Col. 1, line 16, "so called" should be --so-called--.

Col. 2, line 42, "tures" should be --tures.--.

Col. 3, line 10, after "generate" insert --a--.

Col. 3, line 16, "time consuming" should be --time-consuming--.

Col. 3, line 50, "digital-to analog" should be --digital-to-analog--.

Col. 3, line 61, "analog-to digital" should be --analog-to-digital--.

Col. 4, line 21, "near end" should be --near-end--.

Col. 5, line 1, "non negligible" should be --non-negligible--.

UNITED STATES PATENT AND TRADEMARK OFFICE
CERTIFICATE OF CORRECTION

PATENT NO. : 4,813,073
DATED : March 14, 1989
INVENTOR(S) : Fuyun Ling

It is certified that error appears in the above-identified patent and that said Letters Patent is hereby corrected as shown below:

Col. 5, line 33, "$-\text{Im}[\delta(k)] \text{Re}[e^{j*}\epsilon_f(k)]-$" should be $--\text{Im}[\delta(k)] \text{Re}[e^{j*}\epsilon_f(k)]--$.

Col. 6, line 9, "$[\hat{E}_f(k-1)]/\alpha$" should be $--[\hat{E}_f(k-1)-\hat{E}_f(K+1)]/\alpha$.

Col. 6, line 15 "$|e^{j*}\not{\epsilon}_f(k)|^2$" should be $--|e^{j*}\epsilon_f(k)|^2--$.

Col. 6, line 16, "$|\hat{e}_f(k)|^2$" should be $--|\hat{E}_f(k)|^2--$.

Col. 6, line 19," $[\alpha 2*E[$" should be $--[\alpha*2*E[--$.

Col. 6, line 52, "Variable threshold" should be --Variable-threshold--.

Col. 6, line 52, "integrate and-dump" should be --integrate-and-dump--.

Col. 7, line 57 "grate and dump" should be --grate-and-dump--.

Col. 8, line 21, "ar" should be --are--.

Col. 8, line 53, claim 6, after "claim" insert --5--.

UNITED STATES PATENT AND TRADEMARK OFFICE
CERTIFICATE OF CORRECTION

PATENT NO. : 4,813,073

DATED : March 14, 1989

INVENTOR(S) : Fuyun Ling

It is certified that error appears in the above-identified patent and that said Letters Patent is hereby corrected as shown below:

Col. 8, line 53, claim 6, "transveral" should be --transversal--.

Signed and Sealed this

Fifteenth Day of October, 1991

*Attest:*

HARRY F. MANBECK, JR.

*Attesting Officer*  *Commissioner of Patents and Trademarks*